No. 660,709. Patented Oct. 30, 1900.
N. B. McGHEE.
FRUIT CLIPPER.
(Application filed Dec. 11, 1899.)

(No Model.)

Witnesses:
George Oltsch.
Hugo Oltsch.

Nicholas B. McGhee
Inventor

UNITED STATES PATENT OFFICE.

NICHOLAS BOIS McGHEE, OF ORANGE, CALIFORNIA.

FRUIT-CLIPPER.

SPECIFICATION forming part of Letters Patent No. 660,709, dated October 30, 1900.

Application filed December 11, 1899. Serial No. 739,999. (No model.)

*To all whom it may concern:*

Be it known that I, NICHOLAS BOIS MCGHEE, of Orange, in the county of Orange, State of California, have invented certain new and useful Improvements in Fruit-Clippers, of which the following is a full, clear, and exact description.

The object of my invention is to provide a fruit-clipper that is designed to be attached to the thumb and first finger of the hand and by means of which the fruit can be separated from its stem and caught in the same hand to which the clipper is attached, and thus enable the fruit to be rapidly gathered with one hand while the other is in use either for holding the boughs of the tree to the ladder or a receptacle for holding the fruit. If desired, clippers can be used on both hands, so one man can do the work of two.

My invention consists in a clipper composed of two blades which are pivotally connected at one end, the upper blade having teeth, like the blade of a saw, and the other with straight cutting edge, and between which edges the single blade is made to close, combined with suitable devices by means of which the clipper is attached to the hand, as will be more fully described hereinafter.

Figure 1:
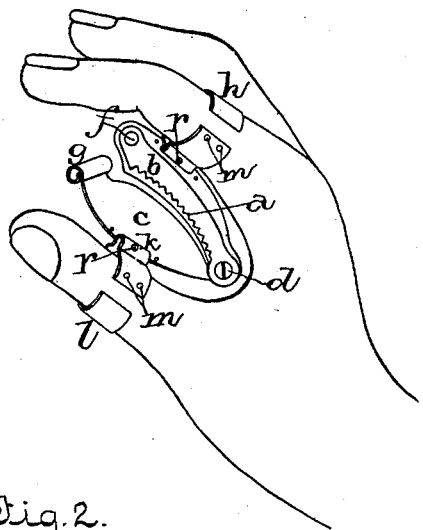
Figure 2:
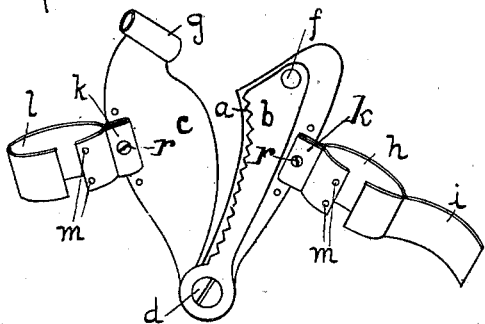
Figure 3:
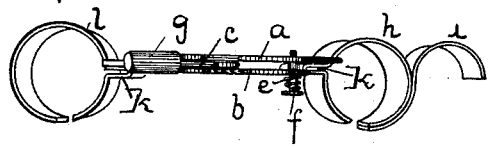

In the accompanying drawings, which represent my invention, Figure 1 is a perspective of the clipper shown attached to the hand. Fig. 2 is a side elevation of the same, and Fig. 3 is a top view.

The clipper comprises a double blade-section having two members $a$ and $b$, between which is pivoted a single blade-section $c$, a screw or pin $d$ serving to effect the connection. The pin $d$ is at one end of the blades $a$ and $b$, and the opposite ends of these blades are held yieldingly together by a spring $e$, carried on a pin $f$, as shown. The edges of the blades $a$, $b$, and $c$ are located adjacent, and the arrangement is such that the blade $c$ may swing between the blades $a$ and $b$ to clip the fruit.
The spring $e$ serves to hold the blades in the proper position and also permits the yielding of the blades $a$ and $b$ as the blade $c$ passes between them, preventing the clogging of the space between the blades $a$ and $b$. The free end of the blade $c$ is formed with a roll or tubulation $g$, which prevents the blades from stabbing or injuring the fruit.

Fastened to the blades $a$ and $b$ is a split collar $h$, which is resilient and which serves to receive the index-finger of the person using the clipper. The collar, being yielding, will adjust itself to the size of the finger. Fastened to the collar $h$ is a bracket $i$, which is adapted to form a rest for the second finger of the person using the instrument. The blade $c$ carries pivotally an angle-piece $k$, which is fastened to a split collar $l$, similar to the collar $h$. Both of the collars $h$ $l$ have a doubled portion $k$ upon their inner sides in contact with the blades, and these doubled portions are adapted to be forced tightly together for the purpose of contracting the collars by means of the screws $r$ or allowed to spring more or less outward for the purpose of increasing the size of the collars. These doubled portions $k$ are formed integral with the collars, and the screws $r$ serve not only to connect the collars to the blades, but to also contract and enlarge the size of the collars at the will of the operator. In Figs. 1 and 3 these doubled or angle pieces $k$ are shown as partially open, whereas in Fig. 2 they are shown contracted by their screws $r$, so as to reduce the collars to their smallest size. This collar $l$ is adapted to receive the thumb of the person, and the collar, being pivotally mounted on the blade $c$, is free to swing with the thumb, and thus accommodate itself to the movements of the fingers. The collars $h$ $l$ are movable and adjustable by a screw to suit any-sized hand and may be attached, if desired, to gloves for protecting the hand of a person. These gloves may be fastened by any desired means—for example, by threads stitched through the opening $m$ in the collars, small bolts, rivets, &c.

Having thus described my invention, I claim as new and desire to secure by Letters Patent—

1. In a fruit-clipper, the two blade-sections pivotally connected, the two collars $h$, $l$, secured to each of the blade-sections, each collar having a doubled or angle portion where it comes in contact with the blade-sections, and the screws by which the collars are fastened to the blade-sections, and which screws pass through the doubled or angle portions, whereby the collars are not only secured to the blade-sections, but are adapted to fit fingers of different thicknesses, substantially as shown.

2. In a fruit-clipper, the two members $a$, $b$, means for forcing these two members inwardly toward each other at their outer ends, and the blade $c$ which has its edge to pass between the two members $a\ b$, combined with the collars $h$, $l$ secured to the blade-sections, and which collars are provided with a doubled or angle portion where they come in contact with the blade-section, and the screws which are passed through the doubled or angle portions not only for securing the collars to the blade-sections, but for regulating the size of the collars, substantially as described.

3. In a fruit-clipper, the two blade-sections pivotally connected at one end, one of the sections consisting of the two members $a$, $b$, which are yieldingly connected at their outer ends, and the blade which has its edge to pass between the members $a\ b$, combined with the collars $h$, $l$, secured to the blade-sections, and means connected with each collar for enlarging or contracting its size, substantially as set forth.

In testimony whereof I affix my signature in presence of two witnesses.

NICHOLAS BOIS McGHEE.

Witnesses:
W. B. WOOD,
W. B. HUTCHINSON.